United States Patent
Genix et al.

[11] Patent Number: 6,021,041
[45] Date of Patent: Feb. 1, 2000

[54] TUNED SHOCK ABSORBING SYSTEM FOR PORTABLE COMPUTER HARD DISC DRIVES

[75] Inventors: Pete Genix; Andrew Moore, both of Austin; Sean O'Neal, Round Rock, all of Tex.

[73] Assignee: Dell U.S.A., L.P, Round Rock, Tex.

[21] Appl. No.: 08/871,511

[22] Filed: Jun. 9, 1997

[51] Int. Cl.[7] .............................. G06F 1/16; H05K 7/10
[52] U.S. Cl. ............................. 361/685; 248/638
[58] Field of Search ...................... 361/683–686, 361/724–727, 752; 248/609–613, 615, 632, 634, 638, 581

[56] References Cited

U.S. PATENT DOCUMENTS

| | | |
|---|---|---|
| 3,258,649 | 6/1966 | Arguin et al. . |
| 4,053,943 | 10/1977 | Galvin . |
| 4,705,257 | 11/1987 | Leo et al. ................................. 248/611 |
| 4,713,714 | 12/1987 | Gati et al. ............................. 360/97.01 |
| 4,949,206 | 8/1990 | Phillips . |
| 4,999,745 | 3/1991 | Shimatani ............................... 361/829 |
| 5,025,336 | 6/1991 | Morehouse et al. . |
| 5,275,371 | 1/1994 | Brian et al. ............................. 248/618 |
| 5,537,270 | 7/1996 | Morehouse et al. . |
| 5,546,250 | 8/1996 | Diel . |
| 5,548,480 | 8/1996 | Rudi et al. .............................. 361/685 |
| 5,552,946 | 9/1996 | Bicknese et al. . |
| 5,673,171 | 9/1997 | Varghese et al. ....................... 361/685 |
| 5,794,913 | 8/1998 | Ho .......................................... 248/688 |

FOREIGN PATENT DOCUMENTS

| | | |
|---|---|---|
| 2-137181 | 5/1990 | Japan . |
| 1485-441 | 6/1989 | U.S.S.R. . |

*Primary Examiner*—Lynn D. Feild
*Attorney, Agent, or Firm*—Haynes and Boone, L.L.P.

[57] ABSTRACT

A portable computer system includes a chassis and a circuit board mounted in an elevated position on mounts provided within the chassis. A space is defined between the board and the chassis and a hard disc drive is mounted on the board. A shock absorbing member extends in the space between the board and the chassis and is spaced from the mounts for limiting flexure of the board toward the chassis in response to impact from forces acting on the computer.

20 Claims, 4 Drawing Sheets

TUNED SHOCK ABSORBING SYSTEM FOR PORTABLE COMPUTER HARD DISC DRIVES

BACKGROUND

The disclosures herein relate generally to portable computer hard disc drives and more particularly to an impact shock absorbing mounting apparatus and method for such hard drives.

Hard disc drives are one of the most common sources of field failures in computers. Within a hard disc drive housing are several thin glass discs, i.e., magnetic media, each having an associated flying head. Thus, hard disc drives are one of the most fragile components of the computer in terms of sensitivity to impact. This is particularly true in cases where a major component of the impact forces is normal to the surface of the hard drive media. Hard disc drives are more sensitive in this orientation because there is opportunity for the read heads to come into physical contact with, and cause damage to the discs.

Upon impact, the heads bounce and contact the discs. The discs may be either broken or scored by such impact. Loose particles may also result from such impact which are free to move around inside the hard disc drive cassette and contact other parts of the drive thus causing new failures. Furthermore, such impacts cause shock to the entire hard disc drive cassette, not just to the heads.

Attempts to cushion the drives against shock from impact have produced elastomer feet in the bottom or rest surface for a cushioning effect of the portable computer housing on its associated rest surface. These feet also serve as friction surfaces to limit lateral movement of the portable computer relative to its rest surface. Cushioned mounts placed within the computer housing provide vibration damping but have not addressed the issue of where such mounts should be located to provide maximum protection from impact shocks. This is an important oversight since protection from the forces from impact shocks require an entirely different solution than protection from vibration.

Therefore, what is needed is a method and apparatus for providing cushioned impact shock protection for hard disc drives in portable computers which protection is strategically located to substantially reduce damage from impact forces acting normal to the bottom surface of the portable computer housing.

SUMMARY

One embodiment, accordingly, provides impact shock protection for hard disc drives in portable computers. To this end, a computer system includes a chassis and a circuit board mounted in an elevated position on mounts provided within the chassis. A space is defined between the board and the chassis. A shock absorbing device extends in the space between the board and the chassis and is spaced from the mounts for limiting flexure of the board toward the chassis in response to impact from forces acting on the computer.

A principal advantage of this embodiment is that impact shock protection in portable computers is greatly enhanced which substantially reduces damage from impact forces acting normal to the bottom surface of the portable computer housing.

DETAILED DESCRIPTION OF THE PREFERRED EMBODIMENT

Figure 1:
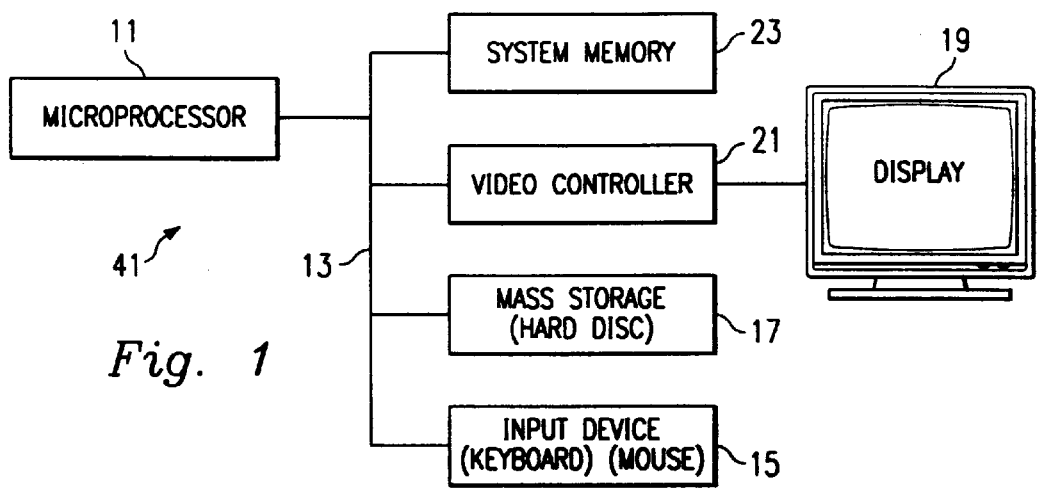
FIG. 1 is a diagrammatic view illustrating an embodiment of a computer system.

In one embodiment, a computer system 41, FIG. 1, includes a microprocessor 11 which is connected to a bus 13. Bus 13 serves as a connection between microprocessor 11 and other components of computer system 41. An input device 15 is coupled to microprocessor 11 to provide input to microprocessor 11. Examples of input devices include keyboards, touchscreens, and pointing devices such as mouses, trackballs and trackpads. Programs and data are stored on a mass storage device 17 which is coupled to microprocessor 11. Mass storage devices include such devices as hard disks, optical disks, magneto-optical drives, floppy drives, ROMs and the like. Computer system 41 further includes the display 19 which is coupled to microprocessor 11 by a video controller 21. A system memory 23 is coupled to microprocessor 11 to provide the microprocessor with fast storage to facilitate execution of computer programs by microprocessor 11. It should be understood that other busses and intermediate circuits can be deployed between the components described above and microprocessor 11 to facilitate interconnection between the components and the microprocessor.

Figure 2:
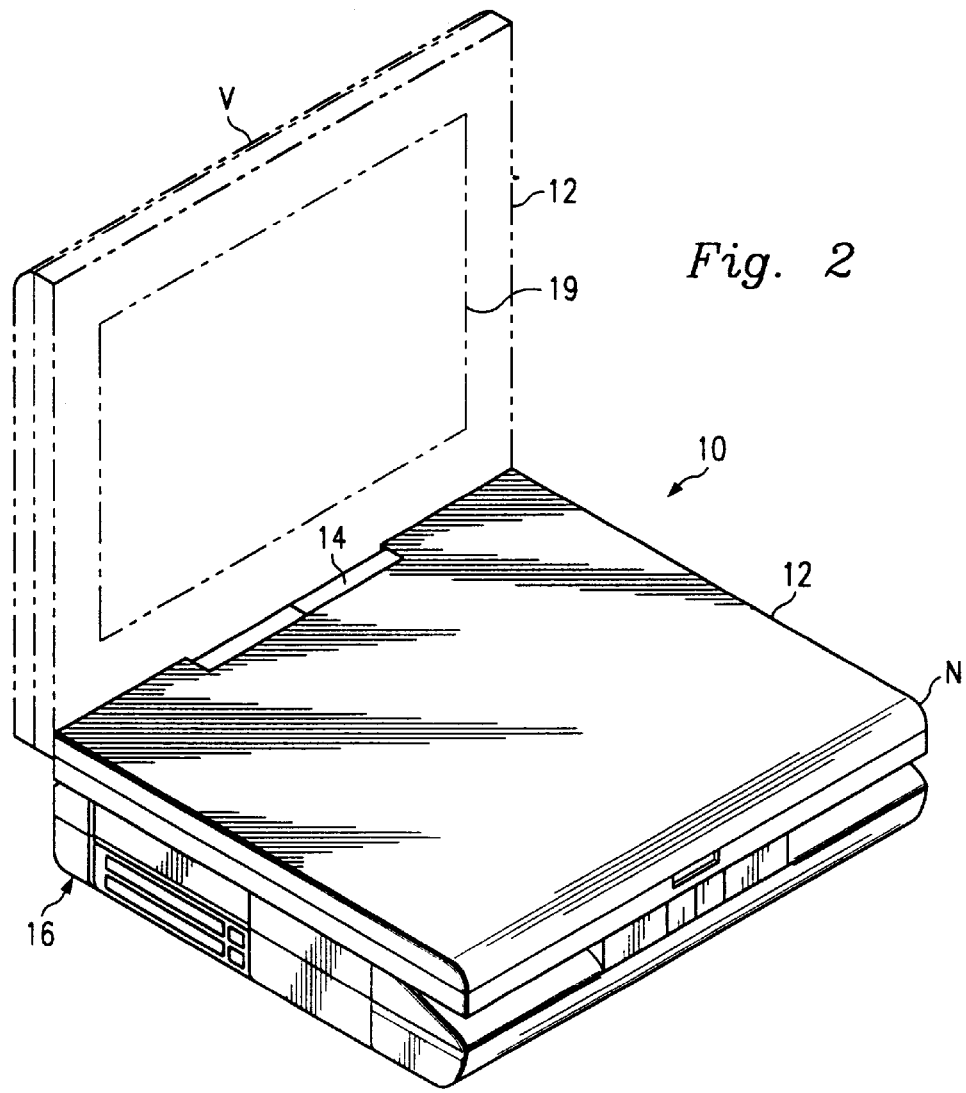
FIG. 2 is an isometric view illustrating an embodiment of a portable computer.

Referring to FIG. 2, illustrated is a portable, notebook size computer designated 10 including the self-contained computer system 41, FIG. 1. Computer 10, FIG. 2, includes a hinged top or lid 12 including display 19 rotatable about a pivotal member 14 from a nested position "N", with a horizontal base 16, to a substantially vertical position "V".

Figure 3:
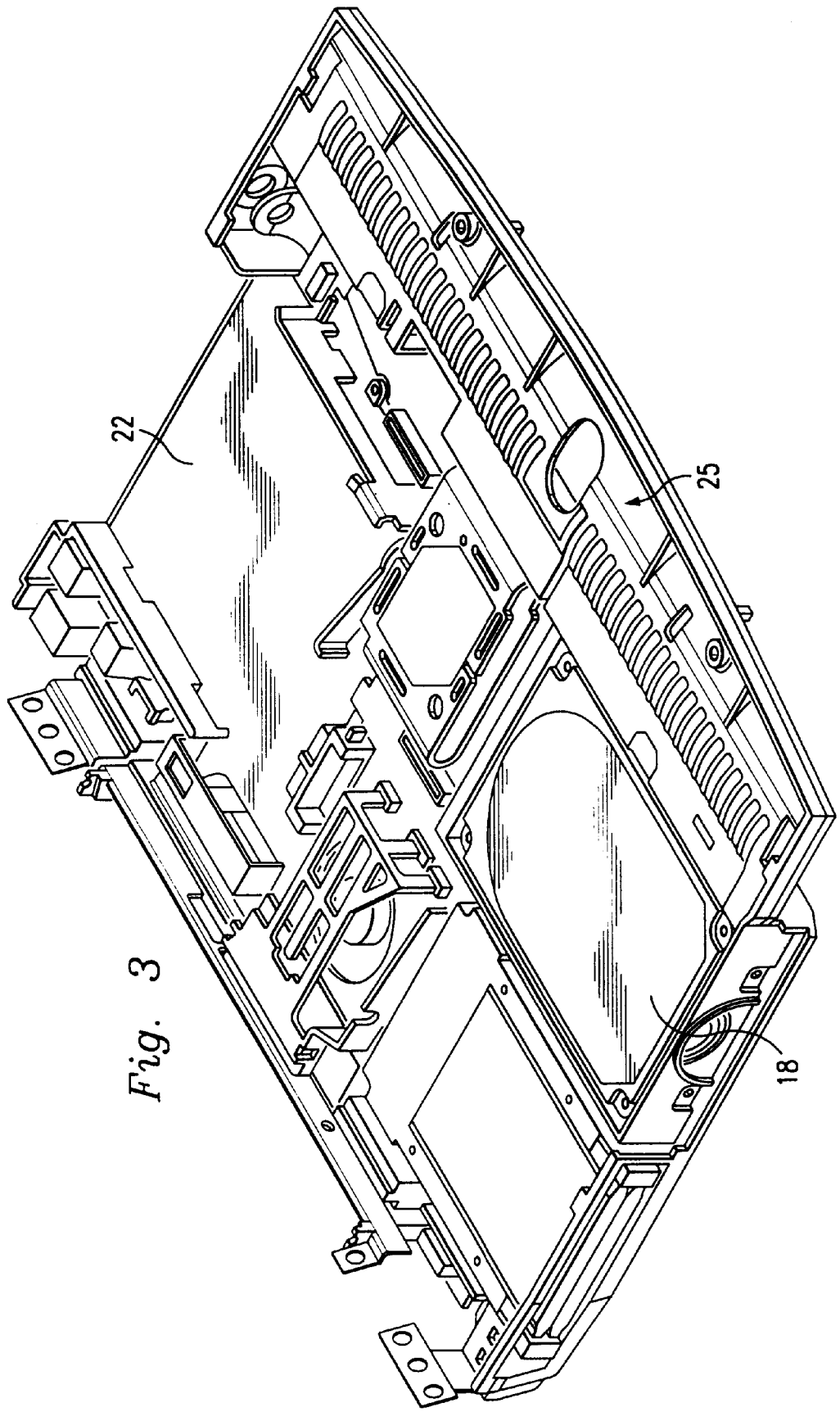
FIG. 3 is an isometric view illustrating an embodiment of a portable computer chassis.

In FIG. 3, computer 10 includes a chassis 25 formed of a suitable plastic material and having a hard disc drive 18 mounted therein. Chassis 25, FIG. 4, includes mounts 20 spaced apart and located adjacent the periphery of a printed circuit (PC) board 22. A plurality of mounting screws 27 are commonly used to secure PC board 22 on the mounts 20. Although only two of such mounts 20 are shown, there are preferably provided one mount 20 at each of the four corners of PC board 22.

Figure 4:
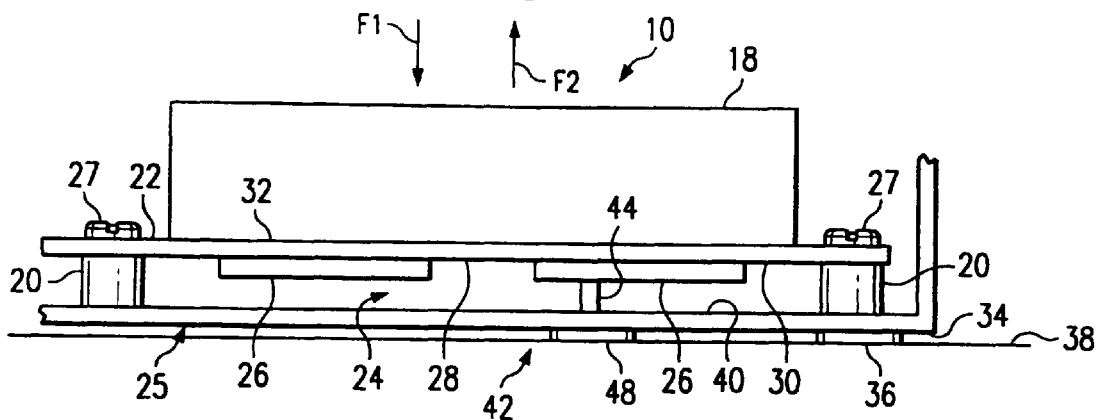
FIG. 4 is a partial side view diagrammatically illustrating an embodiment of a hard drive shock absorbing device.

Mounts 20, FIG. 4, support PC board 22 in an elevated position above a portion of chassis 25 such that a space 24 is defined between PC board 22 and chassis 25. A plurality of components including SIMM connectors 26 are mounted on a surface 30 of PC board 22 so that the connectors extend into space 24. Due to the mounting arrangement of PC board 22 on spaced apart mounts 20, PC board 22 spans space 24 between mounts 20. This results in an unsupported expanse 28 of PC board 22 bridging the space 24 between mounts 20 which is subject to flexure.

Hard disc drive 18 is mounted on a surface 32 of PC board 22 along the expanse 28. An external bottom or rest surface 34 of chassis 25 includes a skid foot 36. Typically, a skid foot 36 is provided at each of the four corners of chassis 25. The purpose of the skid foot 36 is two-fold. First, skid foot 36 may be formed of an elastomer which provides some shock protection when rest surface 34 impacts an adjacent support surface 38. Second, skid foot 36 provides a frictional engagement between computer 10 and surface 38 which helps stabilize computer 10 and resists lateral movement of computer 10 on surface 38.

As a result of this construction, should computer 10 be dropped so that surface 34 including skid feet 36 impact support surface 38, a major component of the resulting initial impact force F1 acts downwardly toward and normal to surface 38. Skid feet 36 absorb very little of such impact force. Expanse 28 of board 22 momentarily flexes into space 24 a sufficient amount to permit the board 22, SIMM connectors 26 or other components to contact or "slap" against an internal surface 40 of chassis 25. In addition, external surface 34 of chassis 16 can flex between skid feet 36 and "slap" against support surface 38. Reaction or secondary impact forces F2 then act in the opposite direction, or upwardly toward and normal to hard disc drive 18. Such initial and secondary forces impose high shock loads on the hard disc drive 18 and its internal components, causing severe damage to the discs and flying heads (not shown). In addition, when expanse 28 of board 22 flexes into space 24, it momentarily flexes away from hard disc drive 18 and then returns to engage the hard disc drive 18 and force the hard disc drive 18 in an upward direction to impact with an upper surface (not shown) of chassis 25.

A benefit of the embodiments described herein is that such shock loads can be substantially limited in their damaging effect on hard disc drive 18. This is accomplished by providing means such as a shock absorbing device generally designated 42, positioned to extend in space 24 between PC board 22 and chassis 25. Shock absorbing device 42 is spaced from mounts 20 for limiting flexure of expanse 28 toward chassis 25 in response to impact forces acting on computer 10.

Figure 5:
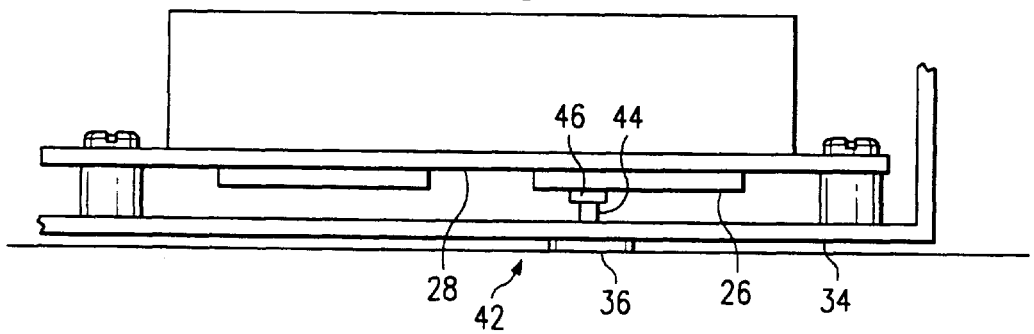
FIG. 5 is a partial side view diagrammatically illustrating an alternative embodiment of a hard drive shock absorbing device.

In FIG. 4, shock absorbing device 42 includes at least one rigid member 44 formed of a plastic material and attached to or formed with chassis interior surface 40 and extending therefrom toward PC board 22. Rigid member 44 may extend to contact expanse 28 of board 22 or may contact a board component such as SIMM connector 26. In addition to rigid member 44, a resilient shock foot member 48, FIG. 4, is mounted on exterior surface 34 of chassis 16 adjacent skid foot 36. Furthermore, shock foot member 48 is aligned with rigid member 44. FIG. 5 illustrates that rigid member 44 may include a resilient cap member 46 which contacts expanse 28 or board component 26 to enhance the shock absorbing ability of rigid member 44. Rather than adding shock foot member 48, it is optionally possible to move skid foot member 36 to a position directly aligned with rigid member 44, FIG. 5. Thus, instead of having both a skid foot member 36 and a shock foot member 48, the skid foot member 36 can serve a dual purpose.

Figure 6:
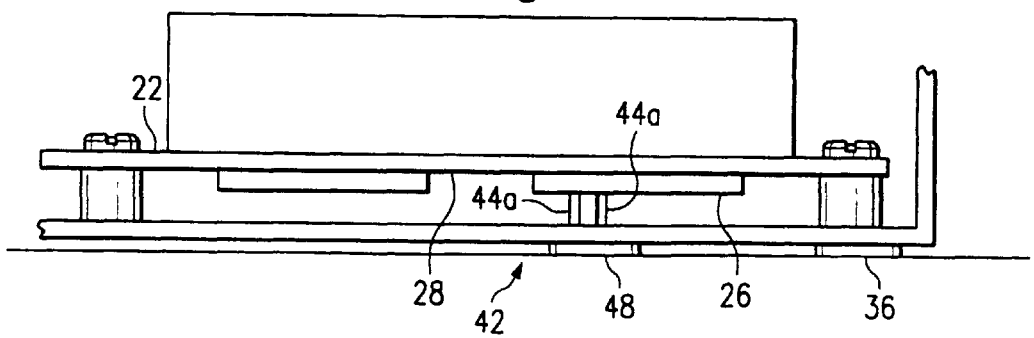
FIG. 6 is a partial side view diagrammatically illustrating another alternative embodiment of a hard drive shock absorbing device.
Figure 7:
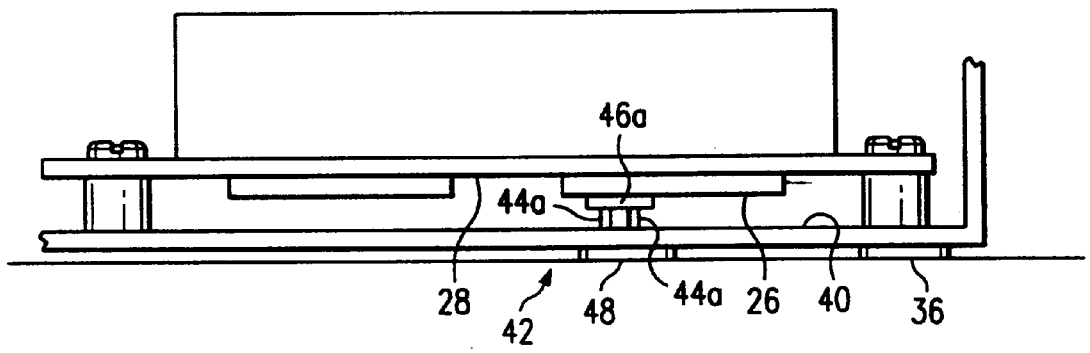
FIG. 7 is a partial side view diagrammatically illustrating still another alternative embodiment of a hard drive shock absorbing device.

In FIG. 6, shock absorbing device 42 includes a plurality of rigid members 44a formed of plastic material and attached to or formed with chassis interior surface 40 and extending therefrom toward PC board 22. Rigid members 44a may extend to contact expanse 28 of board 22 or may contact a board component such as SIMM connector 26. FIG. 7 illustrates that rigid members 44a may include a resilient cap member 46a which contacts expanse 28 or board component 26 to enhance the shock absorbing ability of rigid members 44a.

Figure 8:
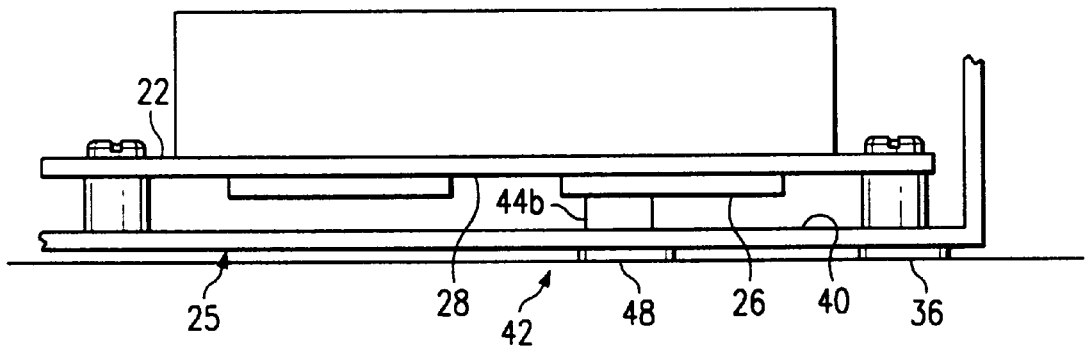
FIG. 8 is a partial side view diagrammatically illustrating a further alternative embodiment of a hard drive shock absorbing device.

In FIG. 8, shock absorbing device 42 includes a resilient member 44b formed of a suitable elastomer and mounted on interior surface 40 of chassis 25 so as to extend therefrom toward PC board 22. Resilient member 44b may extend to contact expanse 28 of board 22 or may contact a board component such as SIMM connector 26.

As it can be seen, the principal advantages of the shock absorbing system for hard disc drives, according to the embodiments disclosed herein, are that it provides a method and apparatus for providing cushioned impact shock protection for hard disc drives in portable computers. The protection afforded thereby is strategically located to substantially reduce damage from impact forces acting normal to the bottom surface of the portable computer housing.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system comprising:
   a) a chassis;
   b) a circuit board mounted in an elevated position on mounts provided within the chassis, the board and chassis defining a space therebetween; and
   c) a shock absorbing device positioned to extend in the space between the board and the chassis, and limit flexure of the board toward the chassis in response to impact forces acting on the computer, the shock absorbing device being connected to the chassis and laterally spaced from the mounts;
   wherein the shock absorbing device is in contact with, but not connected to the board.

2. The computer system as defined in claim 1 wherein the shock absorbing device includes at least one rigid member extending from the chassis toward the board.

3. The computer system as defined in claim 2 wherein the rigid member includes an elastomer member mounted thereon adjacent the board.

4. The computer system as defined in claim 1 wherein the shock absorbing means includes a plurality of adjacent, spaced apart rigid members extending from the chassis toward the board.

5. The computer system as defined in claim 4 wherein the rigid members include an elastomer member mounted therein adjacent the board.

6. The computer system as defined in claim 1 further comprising a skid foot mounted on an exterior surface of the chassis adjacent the shock absorbing device.

7. The computer system as defined in claim 6 further comprising a shock foot mounted on the exterior surface of the chassis adjacent the skid foot and aligned with the shock absorbing device.

8. The computer system as defined in claim 1 wherein the shock absorbing means is an elastomer member.

9. The computer system as defined in claim 1 further comprising a skid foot mounted on an exterior surface of the chassis in alignment with the shock absorbing means.

10. The computer system as defined in claim 1 wherein the shock absorbing means extends from an interior surface of the chassis and further comprising a skid foot mounted on an exterior surface of the chassis in alignment with the shock absorbing means.

11. A hard disc drive shock absorber for a portable computer system comprising:
   a) a chassis;
   b) a circuit board mounted in an elevated position on peripheral mounts provided within the chassis, the board and chassis defining a space there between;
   c) a hard disc drive mounted on the board; and
   d) shock absorbing means extending toward the board from an interior surface of the chassis into the space between the board and chassis, the shock absorbing means being connected to the chassis and laterally spaced from the mounts for limiting flexure of the board toward the chassis upon contact of the board with the shock absorbing means in response to impact forces acting on the computer;
   wherein the shock absorbing means is in contact with, but not connected to, the board.

12. The portable computer system as defined in claim 11 wherein the shock absorbing means includes at least one rigid member.

13. The portable computer system as defined in claim 12 wherein the rigid member includes an elastomer member mounted thereon adjacent the board.

14. The portable computer system as defined in claim 11 wherein the shock absorbing means includes a plurality of adjacent, spaced apart rigid members.

15. The portable computer system as defined in claim 14 wherein the rigid members include an elastomer member mounted thereon adjacent the board.

16. The portable computer system as defined in claim 11 wherein the shock absorbing means is an elastomer member.

17. The portable computer system as defined in claim 11 further comprising a skid foot mounted in an exterior surface of the chassis adjacent the shock absorbing means.

18. The portable computer system as defined in claim 11 further comprising a skid foot mounted on an exterior surface of the chassis opposite the shock absorbing means.

19. The portable computer system as defined in claim 18 wherein the skid foot is an elastomer member.

20. A method of protecting a hard disc drive from impact shock loads in a chassis of a portable computer system comprising the steps of:
   a) mounting a circuit board in an elevated position on mounts provided in the chassis, the board and chassis defining a space there between;
   b) mounting the hard disc drive on the board; and
   c) extending a shock absorbing means in the space between the board and the chassis, the shock absorbing means being connected to the chassis and laterally spaced from the mounts for limiting flexure of the board toward the chassis in response to impact forces acting in the computer;
   wherein the shock absorbing means is in contact with, but not connected to, the board.

* * * * *

UNITED STATES PATENT AND TRADEMARK OFFICE
CERTIFICATE OF CORRECTION

PATENT NO.    : 6,021,041
DATED         : February 1, 2000
INVENTOR(S)   : Pete Genix, Andrew Moore and Sean O'Neal It is certified that error appears in the above-identified patent and that said Letters Patent is hereby corrected as shown below:

<u>Column 4,</u>
Lines 53 and 67, please delete the word "means" and insert therefor -- device --.

<u>Column 5,</u>
Lines 3, 5 and 8, please delete the word "means" and insert therefor -- device --.

Signed and Sealed this

Twentieth Day of May, 2003

JAMES E. ROGAN
*Director of the United States Patent and Trademark Office*